Patented June 7, 1938

2,120,131

UNITED STATES PATENT OFFICE 2,120,131

PROCESS OF MAKING CRYSTALLINE MENTHOL

Morton Harris, Birmingham, Ala., assignor, by mesne assignments, to Theodore Swann, Birmingham, Ala.

No Drawing. Application October 17, 1936, Serial No. 106,195

6 Claims. (Cl. 260—153)

My invention relates to a process for producing synthetic menthol, particularly to a process in which are obtained improved yields of high melting point menthol conforming to natural menthol as described in U. S. Pharmacopoeia, (XI). Such menthol has a melting point of from 42° to 44° C., as compared with a melting point of 30° to 36° C. characterizing synthetic menthols heretofore produced commercially. Also, the menthol produced in accordance with this invention is optically active, having a specific laevo rotation, $Na_D$ line, of from 46° to 50°, as compared with the slightly laevo rotatory, or optically inactive, menthols heretofore produced synthetically on a commercial basis.

The principal objects of my invention are to provide a process whereby increased yields of synthetic U. S. P. menthol may be produced; to provide a means whereby a greater percentage of the higher melting l-menthol may be separated from a mixture of isomers; to provide a process for the esterification of menthols from a mixture of crude menthol isomers which shall proceed smoothly without producing an excess of side reactions; and to provide an improved means for hydrolyzing the menthol esters whereby improved yields of menthol may be obtained.

It is known that the hydrogenation of isopulegol containing a predominance of the laevo rotatory isomers, producers a mixture of menthol isomers with a predominance of l-menthol. Preferably, in carrying out my present invention, isopulegol produced by any suitable process is hydrogenated by known methods to produce crude menthol, which is the mixture of isomers heretofore mentioned, together with other reaction products, or impurities. While menthol may be crystallized out of such a mixture, it will be found to have a lower melting point than U. S. P. menthol, and also to possess a musty odor differing from the familiar menthol odor.

I have discovered that the crude menthol mixture resulting from the hydrogenation of isopulegol may be esterified directly, employing as the esterifying agent an organic acid which gives, in part, an ester of relatively high melting point which may be readily separated out. This crystalline ester after separation, and also the liquid menthyl esters remaining, may be hydrolyzed by caustic soda under pressure in a relatively short period of time, without the use of alcohol and the necessary recovery apparatus and process heretofore known in the art. Upon washing the hydrolyzed products crystalline or liquid menthol is obtained, the grade depending upon the ester hydrolyzed.

In carrying out my invention, I prefer to proceed as follows:

(a) Isopulegol is first hydrogenated by known methods to form a mixture of crude menthols. The mixture thus formed is filtered.

(b) The filtered hydrogenation product is next esterified. The esterification agent should be one which produces an ester which may be crystallized out and particularly one with a relatively high melting point. I have attempted to esterify crude menthol by treating it with phthalic anhydride to form menthyl acid phthalate, but found that the ester formed could not be crystallized, invariably going to a glasslike product upon cooling. The magnesium salt of the acid ester presented as much difficulty along this line as did the acid ester.

I have discovered that the crude menthol may be esterified and a high melting point ester crystallized out by employing benzoic acid as the esterifying agent. From 110% to 130% of the theoretically equivalent amount of acid is added to the crude menthol and is heated to a temperature of from 190° to 210° C. for a period of sixteen to twenty-four hours. In that time the reaction will go to approximately 80% completion, depending upon the quantity of acid employed, which is as far as it is practical to carry it. During esterification, water and a little oil is vaporized and should be condensed, as the extent of the reaction may be determined by the amount of water collected as condensate.

(c) When the reaction has gone to approximately 80% completion, the unreacted menthol, excess of benzoic acid, and menthyl benzoate are separated by fractional distillation. If the menthyl benzoate is free of foreign or nonvolatile impurities, it may be removed as residue after stripping off the unreacted menthol and excess of benzoic acid. The unreacted menthol and benzoic acid may be utilized with a subsequent batch of crude menthol.

(d) The menthyl benzoate is then cooled slowly to 0° C., is seeded if necessary, and allowed to crystallize. Where isopulegol having a specific laevo rotation of —4.5 to —7 is used as a starting material, approximately 50% will crystallize out as a menthyl benzoate having a freezing point of from 51° to 53.5° C.

(e) The menthyl benzoate crystals are centrifuged while still cold to separate the solid from the liquid benzoate. Upon centrifuging, if the freezing point of the crystals is found to be less than 51°, they should be washed with warm water, possibly with a little alcohol, or any other suitable solvent, added, to free it of any residual liquid reaction product. The freezing point will then be found to have been raised to 51° to 53.5° C.

(f) The crystalline menthyl benzoate is next hydrolyzed by reaction with caustic alkali. I have discovered that this step of the process may be carried out in a much shorter period of time than has heretofore been thought possible in analogous steps, and more economically, by submitting the menthol esters to the action of the caustic while under pressure and at a relatively high temperature. To accomplish this, I add around 110% of the theoretical required quantity of caustic alkali, such as sodium hydroxide, in a 15% solution. The hydrolysis is carried out in an autoclave provided with a mechanical stirrer. The temperature may vary from 180° to 220° C. and the pressure from 120 pounds per square inch to 300 pounds per square inch. At 200° C. and around 200 pounds pressure, the hydrolysis will be found to be complete in from one and one-half to three hours. Higher concentrations of caustic will satisfactorily hydrolyze the ester but will cause crystallization of the sodium benzoate formed, when cooled to room temperature. For this reason, I prefer to employ around 110% of the theoretical quantity required in a 15% aqueous solution.

(g) After the hydrolysis is complete it is allowed to cool, whereupon the menthol separates from the alkali benzoate. The menthol layer is then separated and washed, preferably with the addition of a small amount of dilute sulphuric acid. The acidified product is then washed with warm water until neutral. Upon cooling the menthol solidifies.

(h) The neutral menthol is then subjected to simple distillation at a pressure of around 10 mm. in order to obtain a water white product.

(i) The purified menthol obtained from the process as thus far described is next dissolved in a suitable solvent, such as alcohol, toluol, benzene, or solvent naphtha, and recrystallized. The crystals thus produced are relatively large, clear crystals, having a melting point of from 42° to 44° C., and conforming to the U. S. Pharmacopoeia.

The liquid menthyl benzoate fraction described in step (e) may also be hydrolyzed, washed, and redistilled to produce what is known in the trade as "liquid menthol", which has a wide use in the manufacture of cosmetics.

From the foregoing it will be apparent that I have devised an improved method of producing U. S. P. menthol, which is simple and effective, and one which may be carried out with a minimum loss of material and a minimum formation of degradation products. It will also be apparent that, while my improved process is directed particularly to the formation of U. S. P. menthol, the steps employed may be applied with equal benefit to the production of menthols other than the particular high melting point laevo rotatory menthol specified in the U. S. Pharmacopoeia.

While I have described but one method of carrying out my invention, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. The method of producing synthetic U. S. P. menthol which comprises esterifying a mixture of crude synthetic menthols by heating with from 110% to 130% of the theoretical amount of the required benzoic acid to form menthyl benzoate, condensing and collecting the water vaporized during esterification, cooling to crystallize out that fraction having a melting point of from 51° to 53° C., saponifying said fraction, and recrystallizing.

2. The method of producing synthetic U. S. P. menthol which comprises esterifying a mixture of crude synthetic menthols with benzoic acid, condensing and collecting water vaporized during esterification, separating out crystalline menthyl benzoate having a melting point of from 51° to 53° C., hydrolyzing with caustic soda at a temperature of from 180° to 220° C., and recrystallizing the menthol thus formed.

3. The method of producing synthetic U. S. P. menthol which comprises esterifying a mixture of crude synthetic menthols by heating with from 110 to 130 per cent of the theoretical amount of benzoic acid required, condensing and collecting water vaporized during esterification, separating out crystalline menthyl benzoate having a melting point of from 51° to 53° C., hydrolyzing with aqueous caustic soda at a temperature of from 180° to 220° C., and recrystallizing the menthol thus formed.

4. In a process of producing synthetic menthol, the step of hydrolyzing menthyl benzoate which comprises reacting caustic soda in aqueous solution with the menthyl benzoate at a temperature of from 180° to 220° C. and a pressure of from 120 to 300 pounds per square inch.

5. In a process of producing synthetic U. S. P. menthol from hydrogenated isopulegol, reacting with benzoic acid to form menthyl benzoate, and hydrolyzing the menthyl benzoate having a melting point of from 51° to 53° C. by reacting with approximately 110% of the theoretical amount of caustic required under a pressure of around 200 pounds per square inch and at a temperature of approximately 200° C. with agitation.

6. In a process of producing synthetic U. S. P. menthol from hydrogenated isopulegol, reacting with benzoic acid to form menthyl benzoate, hydrolyzing the menthyl benzoate having a melting point of from 51° to 53° C. by reacting with approximately 110% of the theoretical amount of caustic required under a pressure of around 200 pounds per square inch and at a temperature of approximately 200° C. with agitation, separating the menthol thus formed, dissolving in an organic solvent, and recrystallizing.

MORTON HARRIS.